(12) United States Patent
Kim et al.

(10) Patent No.: US 11,122,542 B2
(45) Date of Patent: Sep. 14, 2021

(54) SIGNAL TRANSMISSION METHOD FOR V2X COMMUNICATION IN WIRELESS COMMUNICATION SYSTEM, AND DEVICE THEREFOR

(71) Applicant: LG ELECTRONICS INC., Seoul (KR)

(72) Inventors: Youngtae Kim, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 16/305,754

(22) PCT Filed: Jun. 26, 2017

(86) PCT No.: PCT/KR2017/006688
§ 371 (c)(1),
(2) Date: Nov. 29, 2018

(87) PCT Pub. No.: WO2017/222351
PCT Pub. Date: Dec. 28, 2017

(65) Prior Publication Data
US 2020/0322924 A1  Oct. 8, 2020

Related U.S. Application Data

(60) Provisional application No. 62/393,117, filed on Sep. 12, 2016, provisional application No. 62/354,127, filed on Jun. 24, 2016.

(51) Int. Cl.
*H04W 72/02* (2009.01)
*H04W 4/44* (2018.01)
(Continued)

(52) U.S. Cl.
CPC .......... *H04W 72/02* (2013.01); *H04L 1/0003* (2013.01); *H04L 1/0009* (2013.01);
(Continued)

(58) Field of Classification Search
CPC ... H04L 1/0003; H04L 1/0009; H04L 5/0053; H04W 4/44; H04W 28/0205;
(Continued)

(56) References Cited

U.S. PATENT DOCUMENTS 7,860,451 B2 * 12/2010 Hwang ................ H04W 52/46
455/7
9,832,706 B2 * 11/2017 Miranda d'Orey ... H04W 40/12
(Continued)

FOREIGN PATENT DOCUMENTS

CN  107205256 A  *  9/2017
CN  109890014 A  *  6/2019
(Continued)

OTHER PUBLICATIONS

PCT International Application No. PCT/KR2017/006688, Written Opinion of the International Searching Authority dated Sep. 26, 2017, 18 pages.
(Continued)

*Primary Examiner* — Eric Nowlin
(74) *Attorney, Agent, or Firm* — Lee, Hong, Degerman, Kang & Waimey

(57) ABSTRACT

The present invention relates to a method by which a vehicle-to-everything (V2X) terminal performs V2X communication in a wireless communication system, and a device. Particularly, the method comprises the steps of: receiving information on a resource pool for V2X communication; and transmitting a message for at least one of a plurality of communication services having different coverages, on the basis of the resource pool.

10 Claims, 10 Drawing Sheets

(51) Int. Cl.
*H04W 76/14* (2018.01)
*H04L 1/00* (2006.01)
*H04L 5/00* (2006.01)
*H04W 28/02* (2009.01)
*H04W 72/04* (2009.01)

(52) U.S. Cl.
CPC ............ *H04L 5/0053* (2013.01); *H04W 4/44* (2018.02); *H04W 28/0205* (2013.01); *H04W 72/0446* (2013.01); *H04W 76/14* (2018.02)

(58) Field of Classification Search
CPC . H04W 72/02; H04W 72/04; H04W 72/0446; H04W 72/048; H04W 76/14
See application file for complete search history.

(56) References Cited

U.S. PATENT DOCUMENTS

| | | | |
|---|---|---|---|
| 10,212,642 B2* | 2/2019 | Li | H04W 76/14 |
| 10,212,673 B2* | 2/2019 | Angiwal | H04W 64/006 |
| 10,440,687 B2* | 10/2019 | Wei | H04W 72/04 |
| 10,616,864 B2* | 4/2020 | Sheng | H04W 72/02 |
| 10,716,092 B2* | 7/2020 | Sheng | H04W 72/02 |
| 10,827,502 B2* | 11/2020 | Basu Mallick | H04W 64/00 |
| 10,985,836 B2* | 4/2021 | Kamei | H04L 45/22 |
| 2008/0076349 A1* | 3/2008 | Hwang | H04B 7/15535 455/7 |
| 2013/0272190 A1* | 10/2013 | Du | H04W 28/16 370/315 |
| 2016/0135239 A1 | 5/2016 | Khoryaev et al. | |
| 2016/0295624 A1* | 10/2016 | Novlan | H04W 72/04 |
| 2016/0337936 A1* | 11/2016 | Li | H04W 76/14 |
| 2017/0006586 A1* | 1/2017 | Gulati | H04W 72/0446 |
| 2017/0188330 A1* | 6/2017 | Bischinger | H04W 52/283 |
| 2017/0215123 A1* | 7/2017 | Miranda d'Orey | H04W 40/12 |
| 2017/0332207 A1* | 11/2017 | Sheng | H04W 4/027 |
| 2018/0041885 A1* | 2/2018 | Li | H04W 8/005 |
| 2018/0041971 A1* | 2/2018 | Agiwal | H04W 4/021 |
| 2018/0054237 A1* | 2/2018 | Tseng | H04W 36/0033 |
| 2018/0054381 A1* | 2/2018 | Guo | H04L 45/127 |
| 2018/0092065 A1* | 3/2018 | Sheng | H04W 4/46 |
| 2018/0262887 A1* | 9/2018 | Futaki | H04W 92/18 |
| 2018/0279388 A1* | 9/2018 | Miao | H04W 16/02 |
| 2018/0376525 A1* | 12/2018 | Feng | H04L 27/0014 |
| 2019/0116586 A1* | 4/2019 | Basu Mallick | H04W 72/048 |
| 2019/0364437 A1* | 11/2019 | Kamei | H04W 48/16 |
| 2019/0379450 A1* | 12/2019 | Kamei | H04B 17/318 |
| 2020/0068510 A1* | 2/2020 | Martin | H04W 52/146 |
| 2020/0092685 A1* | 3/2020 | Fehrenbach | H04B 7/2606 |
| 2021/0014716 A1* | 1/2021 | Zhou | H04L 69/321 |

FOREIGN PATENT DOCUMENTS

| | | | | |
|---|---|---|---|---|
| CN | 107205256 B | * | 5/2020 | |
| EP | 3285443 A1 | * | 2/2018 | ........... H04L 45/127 |
| KR | 20080028697 A | * | 4/2008 | ............ H04B 7/043 |
| KR | 101210332 B1 | * | 12/2012 | ............ H04B 7/043 |
| WO | WO-2015069040 A1 | * | 5/2015 | ............ H04W 72/02 |
| WO | 2015137720 | | 9/2015 | |
| WO | 2016022219 | | 2/2016 | |
| WO | WO-2016015764 A1 | * | 2/2016 | ............. H04W 4/46 |
| WO | WO-2018032794 A1 | * | 2/2018 | ............ H04L 45/127 |

OTHER PUBLICATIONS

Ericsson, "Sidelink Resource Allocation in V2X", 3GPP TSG RAN WG2 Meeting #93bis, R2-162818, Apr. 2016, 6 pages.
Fujitsu, "Discussion on Resource Pool for PC5 based V2V", 3GPP TSG RAN WG1 Meeting #85, R1-164323, May 2016, 7 pages.

* cited by examiner

FIG. 2
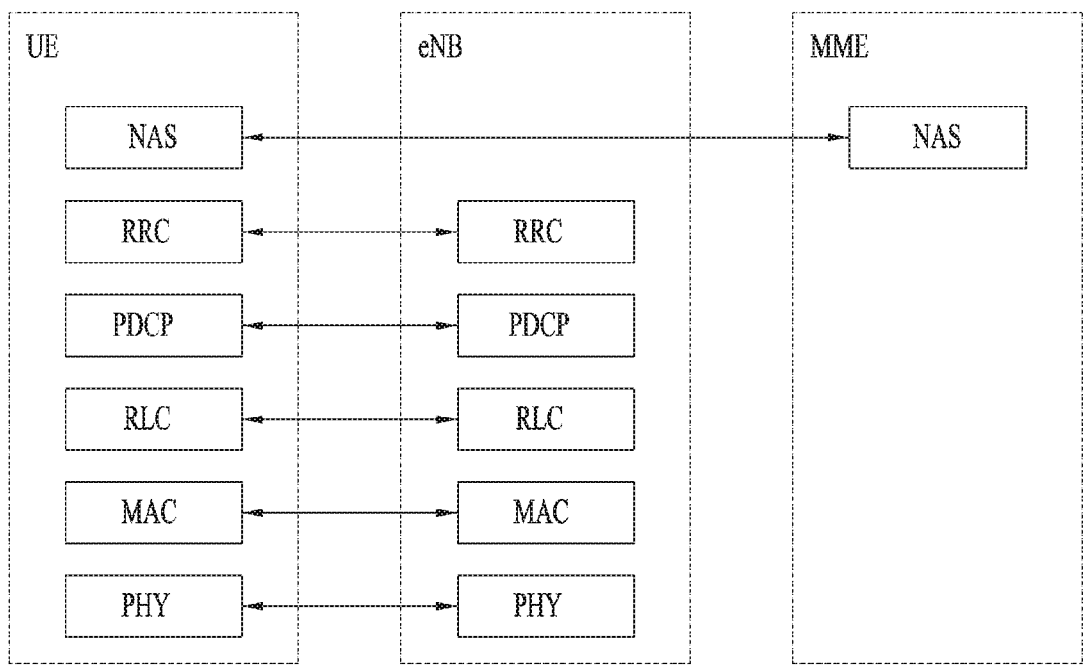
(A) CONTROL-PLANE PROTOCOL STACK
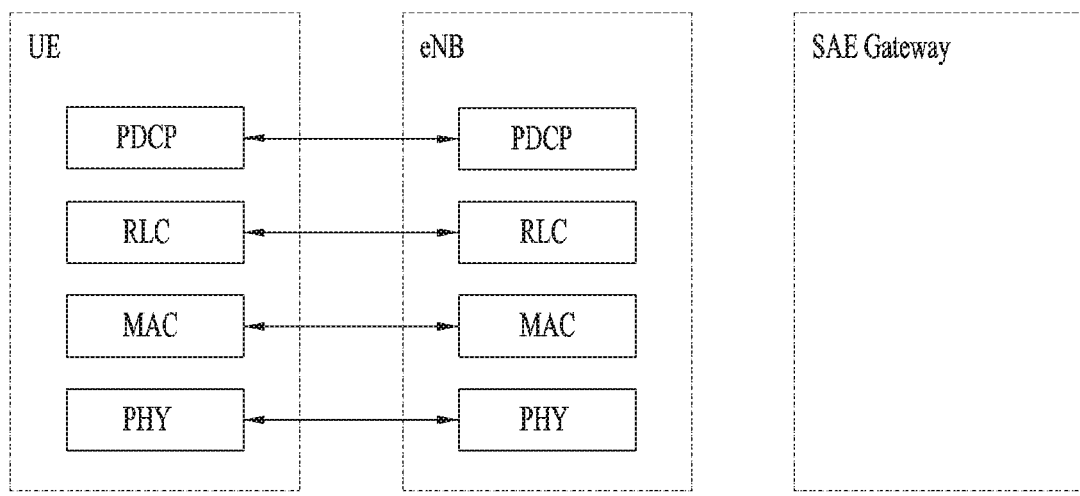
(B) USER-PLANE PROTOCOL STACK FIG. 8
(a) 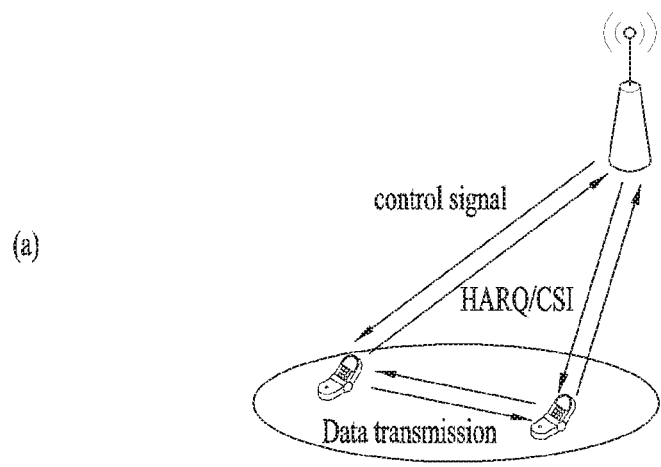
(b) 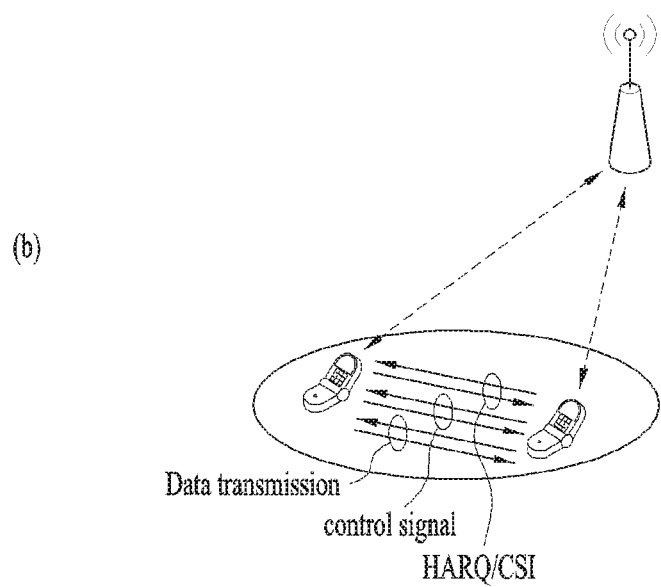

SIGNAL TRANSMISSION METHOD FOR V2X COMMUNICATION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/006688, filed on Jun. 26, 2017, which claims the benefit of U.S. Provisional Application No. 62/354,127, filed on Jun. 24, 2016 and 62/393,117, filed on Sep. 12, 2016, the contents of which are all hereby incorporated by reference herein in their entirety.

TECHNICAL FIELD

The present invention relates to a wireless communication system, and more particularly, to a method of transmitting a signal for V2X communication in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

Based on the aforementioned discussion, the technical task of the present invention is to propose a method of transmitting a signal for V2X communication in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of performing Vehicle-to-Everything (V2X) communication by a V2X user equipment in a wireless communication system, the method including receiving information on a resource pool for the V2X communication and transmitting a message for at least one of a multitude of communication services respectively having different coverages based on the resource pool.

Preferably, the resource pool may be configured differently for each of a multitude of the communication services based on at least one of a transmission power, a size of a transmitted message, a Modulation and Coding Scheme (MCS) value, a retransmission number, a multiple access scheme, a Transmission Time Interval (TTI) length, and a subcarrier spacing.

More preferably, the information on the resource pool may include a specific indicator and the resource pool may be a resource region configured according to at least one combination of a Modulation and Coding Scheme (MCS) corresponding to the specific indicator, the retransmission number, the multiple access scheme, the Transmission Time Interval (TTI) length, and the subcarrier spacing.

Preferably, the resource pool may be shared by a multitude of the communication services. More preferably, a signal may be mapped to a resource set selected for a multitude of the communication services from the resource pool and a power may be configured in a manner that a resource region for each of a multitude of the communication services on the resource set corresponds to a coverage. The resource region for the each of a multitude of the communication services may be configured with resources corresponding to a resource pattern configured to correspond to the power for the communication services. More preferably, the signal may include a message corresponding to a first communication service having a widest coverage among a multitude of the communication services and indicate that second communication services having coverages smaller than that of the first communication service share the selected resource set. And, the signal may include location information on each of a multitude of the communication services.

More preferably, the signal may include a message configured in a manner that at least two communication services having different transmission methodologies applied respectively thereto among a multitude of the communication services are combined together. And, the transmission methodology may include at least one of a power, a power range, a Modulation and Coding Scheme (MCS), an MCS range, a retransmission number, a range of the retransmission number, a resource block size, a range of the resource block size, a multiple access scheme, a Transmission Time Interval (TTI) length, and a subcarrier spacing for each of a multitude of the communication services.

In another technical aspect of the present invention, provided herein is a Vehicle-to-Everything (V2X) user equipment performing V2X communication in a wireless communication system, the V2X user equipment including a radio frequency unit and a processor configured to receive information on a resource pool for the V2X communication and transmit a message for at least one of a multitude of communication services respectively having different coverages based on the resource pool.

Advantageous Effects

According to an embodiment of the present invention, signal transmission for V2X communication can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates control plane and user plane structures of a radio interface protocol between a UE and an E-UTRAN on the basis of the 3GPP wireless access network standard.

FIG. 8 is a reference diagram to describe D2D (UE-to-UE) communication.

BEST MODE FOR INVENTION

Figure 1:
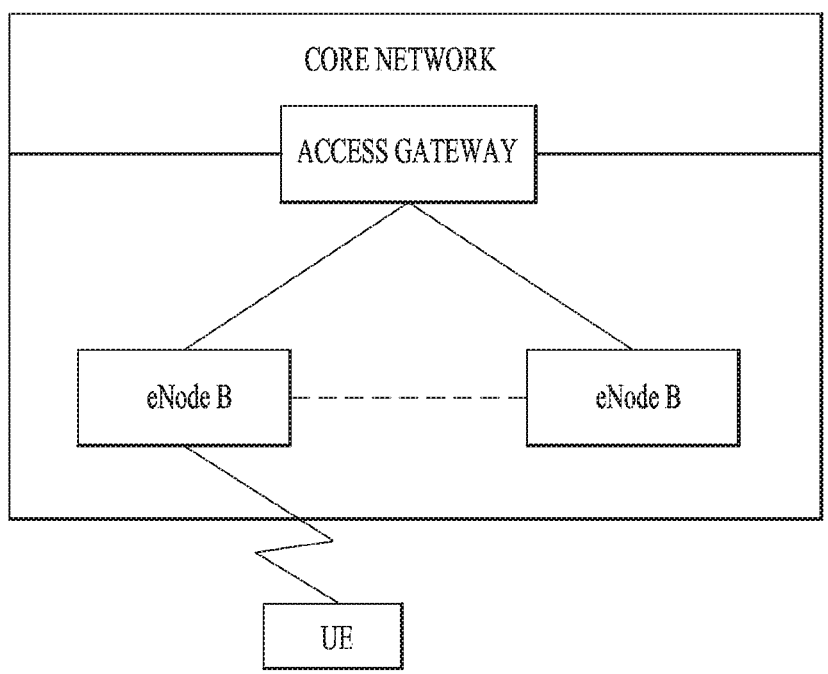
FIG. 1 schematically illustrates an E-UMTS network structure as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
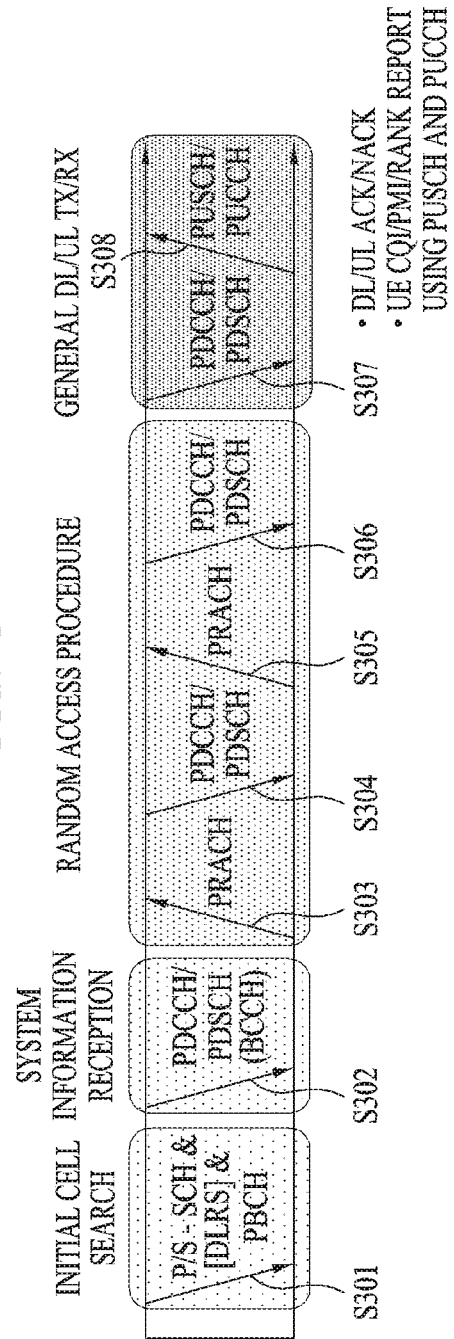
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
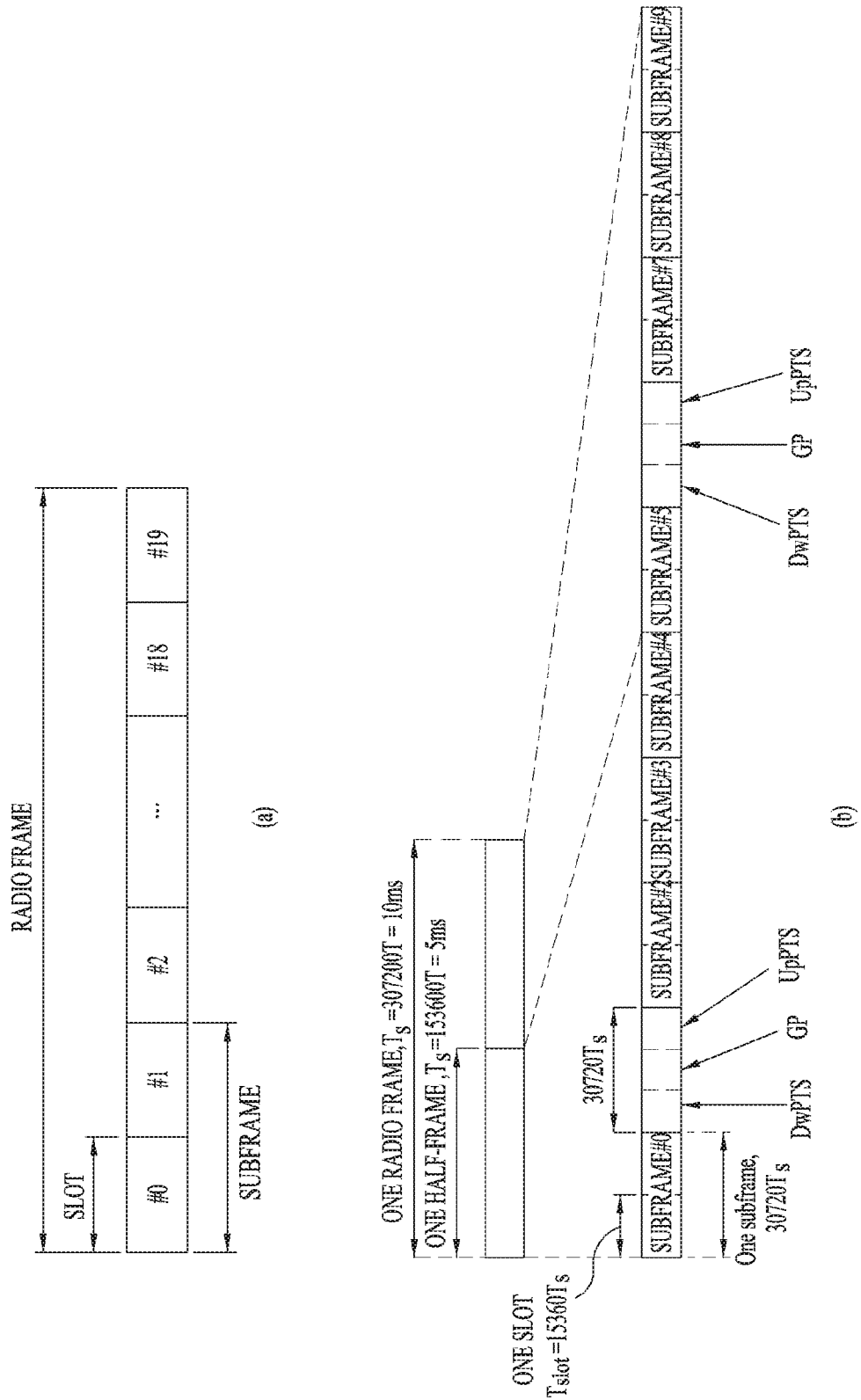
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP).

Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
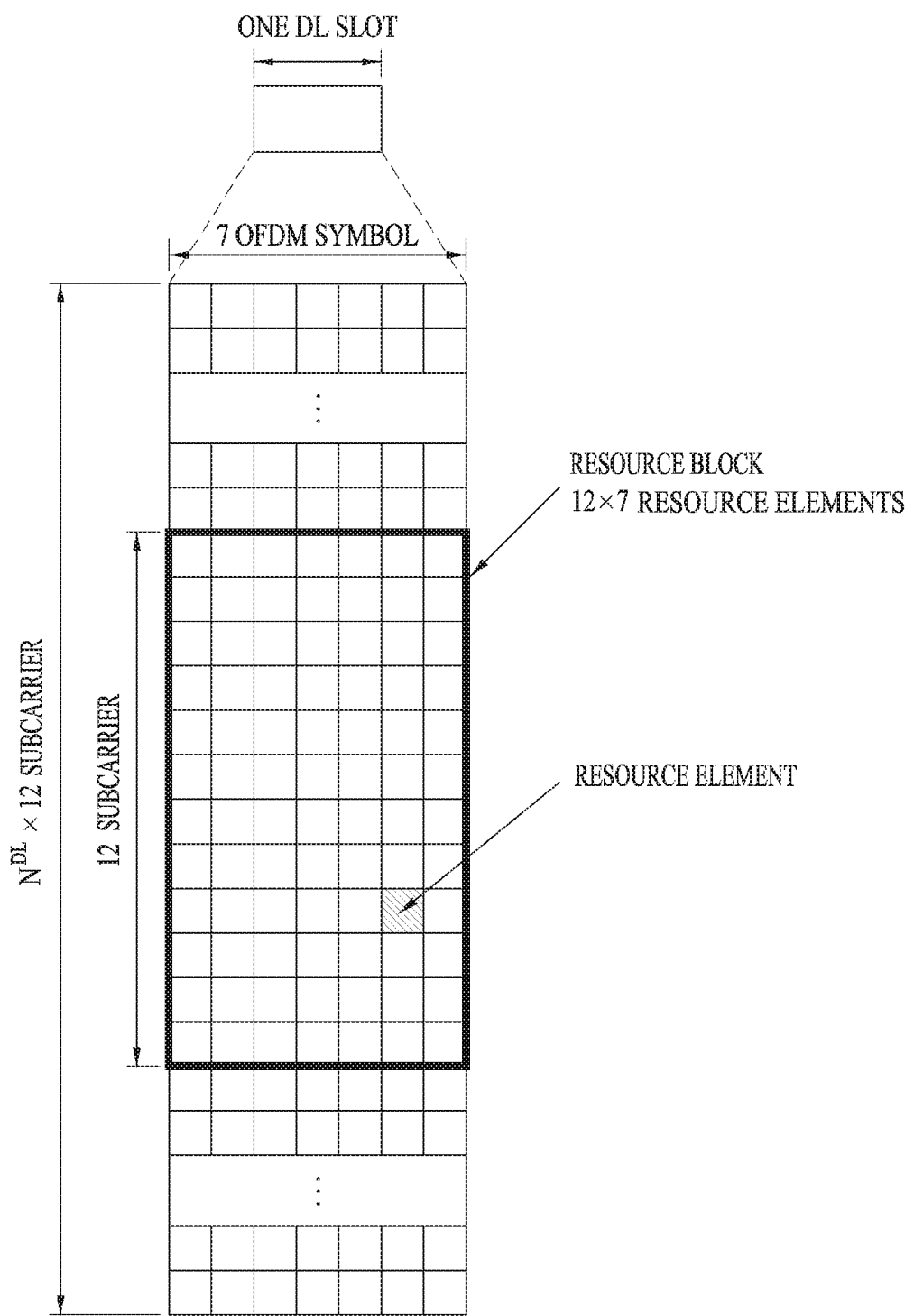
FIG. 5 illustrates a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{SC}^{RB}$ subcarriers, the DL slot includes $N_{RB}^{DL} \times N_{SC}^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{SC}^{RB}$ resource elements. The number ($N_{RB}^{DL}$) of resource blocks

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | | | |
| 9 | 13168 · $T_s$ | | | | | | included in the DL slot depends on a DL transmission bandwidth configured in a cell.

Figure 6:
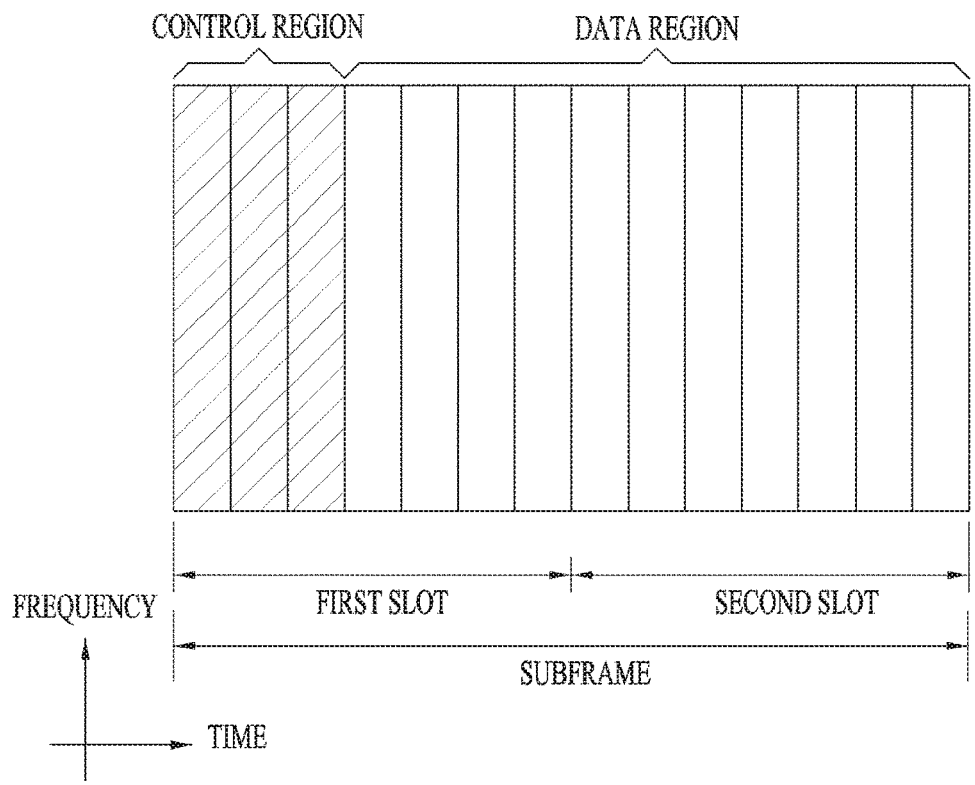
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
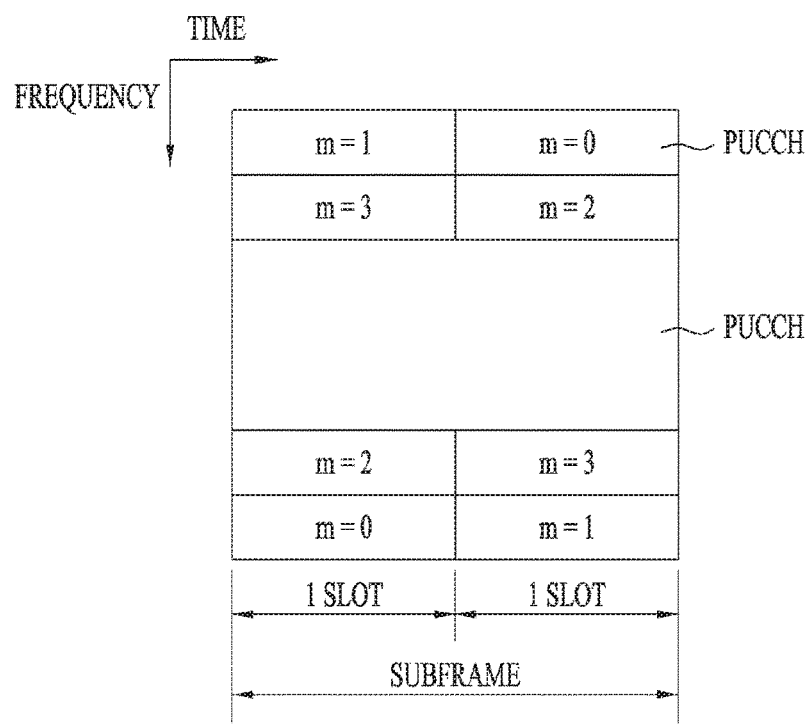
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Referring to FIG. 8, FIG. 8 (*a*) illustrates a scheme in which the network/coordination station intervenes in transmission and reception of control signals (e.g., grant message), HARQ, channel state information, etc. and user equipments that perform D2D communication transmit and receive data only. On the other hand, FIG. 8 (*b*) illustrates a scheme in which the network provides minimum information (e.g., D2D connection information available in a corresponding cell) only but the user equipments that perform D2D communication establish links to transmit and receive data.

Figure 9:
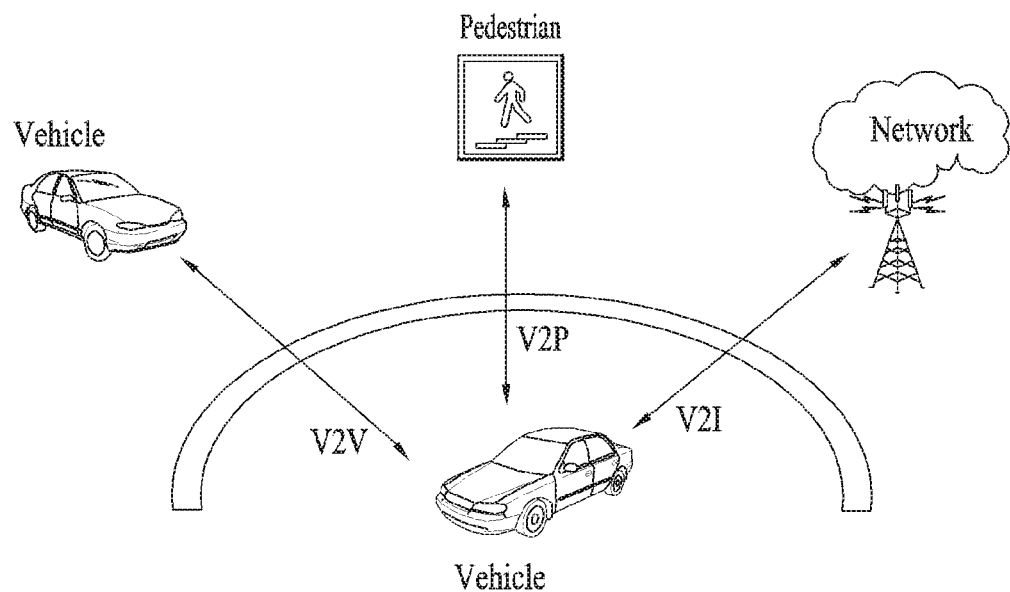
FIG. 9 is a reference diagram to describe a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I) communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, resource allocation for performing V2X communication in the present invention is described. Although the present invention is described by being limited to a V2X scenario for clarity of the description, the present invention is applicable to other communication systems such as Device-to-Device (D2D) communication.

Figure 10:
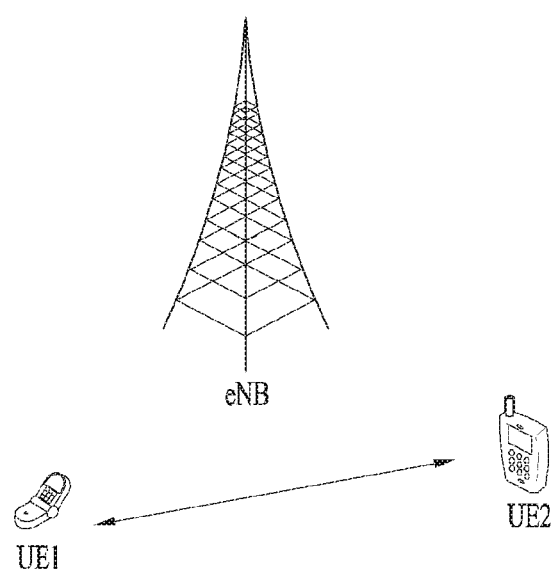
FIG. 10 and FIG. 11 are reference diagrams to describe a resource pool on a D2D scenario.

FIG. 10 is a reference diagram to describe UE-to-UE direct communication. When a UE performs communication with another UE using a direct wireless channel, as shown in FIG. 10, the present invention proposes a method of determining a resource to use for communication. This can be named UE-to-UE direct signal transmission/reception or Device-to-Device (D2D) communication, and further named a sidelink to be distinguished from Downlink (DL) and Uplink (UL) of the existing cellular communication. Furthermore, communication among multiple devices may be named Vehicle-to-Vehicle (V2V) communication in association with vehicles. Hence, although a UE means a user's UE (or car), if a network equipment such as an eNB transmits/receives a signal according to a UE-to-UE communication methodology, the network equipment can be regarded as a sort of UE to which the present invention is applicable. Moreover, an eNB can receive a D2D signal transmitted by a UE. Furthermore, a signal transmitting/receiving method of a UE designed for D2D transmission is applicable to an operation for a UE to transmit data to an eNB.

In the following description, UE1 may operate in a manner of selecting a resource unit corresponding to a specific resource from a resource pool meaning a set of a series of resources and transmitting a D2D signal using the corresponding resource unit. UE2 that is an Rx UE may receive a configuration of a resource pool for the UE1 to transmit a D2D signal and detect a signal of the UE1 within the corresponding resource pool. Here, if the UE1 is in a connection range of a base station, the UE1 can be informed of the resource pool by the base station. If the UE1 is out of the connection range of the base station, the UE1 may be informed of the resource pool by another UE or the resource pool may be determined as a previously determined resource. Generally, a resource pool is configured in a plurality of resource units. Each UE may select a single or a plurality of resource units and use the selected resource unit(s) for D2D signal transmission of its own.

Figure 11:
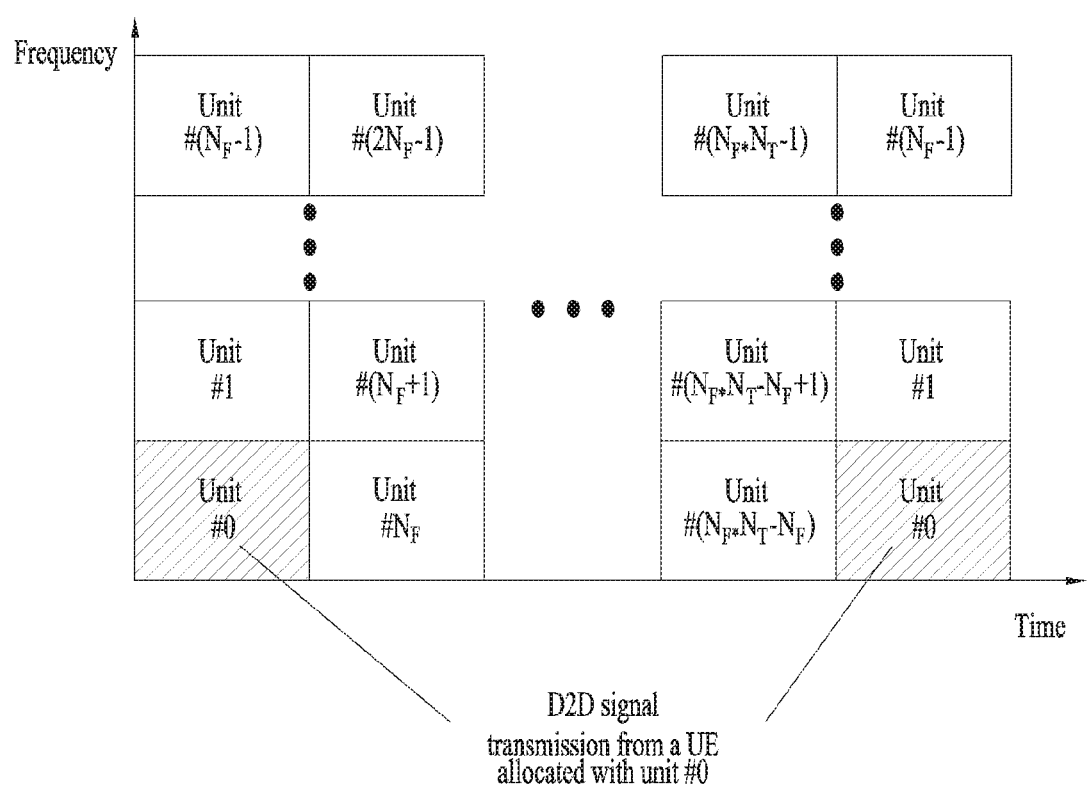

FIG. 11 shows one example of a configuration of resource unit. FIG. 11 illustrates a case that total $N_F*N_T$ resource units are defined in a manner of dividing a full frequency resource into $N_F$ units and dividing a full time resource into $N_T$ units. In FIG. 11, a corresponding resource pool is repeated every $N_T$ subframes. Typically, as shown in FIG. 11, a single resource unit may appear in a manner of being repeated periodically. Or, an index of a physical resource unit, to which one logical resource unit is mapped to obtain a diversity effect in a time or frequency dimension, may change in a predetermined pattern according to a time. In such a resource unit structure, a resource pool may mean a set of resource units usable for a transmission by a UE intending to transmit a D2D signal.

Furthermore, a resource pool can be subdivided into various types. First of all, a resource pool can be divided according to a content of a transmitted D2D signal in each resource pool. For example, a content of a D2D signal can be classified as follows. And, a separate resource pool may be configured for each content.

Scheduling Assignment (SA) (or sidelink control channel): Signal including information such as a location of a resource used for transmission of a following D2D data channel by each transmitting (Tx) UE, a Modulation and Coding Scheme (MCS) required for demodulation of a data channel, an MIMO transmission methodology and the like. Such an SA signal can be transmitted on the same resource unit by being multiplexed with D2D data. In this case, an SA resource pool may mean a resource pool configured with a resource on which an SA is transmitted by being multiplexed with D2D data.

D2D data channel (sidelink shared channel): A resource pool configured with a resource used in transmitting user data by a Tx UE using a resource designated through SA. If a transmission on the same resource unit by being multiplexed with D2D data is possible, only a D2D data channel of a type except SA information is transmitted in a resource pool for the D2D data channel. So to speak, a resource element used in transmitting SA information on an individual resource unit within an SA resource pool is still used to transmit D2D data in a D2D data channel resource pool.

Discovery message (or sidelink discovery channel): A resource pool for a message through which a Tx UE enables an adjacent UE to discover the Tx UE itself by transmitting information such as an ID of the Tx UE and the like.

Synchronization signal/channel (or, sidelink synchronization signal, sidelink broadcast channel): A resource pool for a signal/channel to achieve an object that a Tx UE transmits a synchronization signal and information related to synchronization to enable an Rx (receiving) UE to match up time/frequency synchronization with that of the Tx UE.

Although SA and data may be use a resource pool separated on a subframe, if a UE can simultaneously transmit SA and data in a single frame, two types of resource pools can be configured in the same subframe.

Moreover, in case that the aforementioned D2D signal content is identical, a different resource pool is usable according to a transmission/reception attribute of the D2D signal. For example, despite the same D2D data channel or discovery message, it can be divided into a different resource pool again depending on a transmission timing determining methodology (whether a D2D signal is transmitted at a reception timing of a synchronization reference signal, whether a D2D signal is transmitted by applying a constant timing advance at a repletion timing of a synchronization reference signal, etc.), a resource allocation methodology (e.g., whether a transmission resource of an individual signal is designated to an individual Tx UE by an eNB, or whether an individual Tx UE selects an individual signal transmission resource from a resource pool by itself), a signal format (e.g., the number of symbols occupied in a single subframe by each D2D signal, the number of subframes used for transmission of a single D2D signal), a signal strength from an eNB, a transmit power level of a D2D UE and the like.

For clarity of description, a method for an eNB to directly indicate a transmission resource of a D2D Tx UE in D2D communication is defined as Mode 1. And, a method for a UE to directly select a transmission resource, when a transmission resource region is configured in advance or an eNB designates a transmission resource region, is defined as Mode 2. In case of D2D discovery, a case that an eNB directly indicates a resource is defined as Type 2. And, a case that a UE directly selects a transmission resource from a previously configured resource region or a resource region indicated by an eNB is defined as Type 1.

Moreover, as described above, D2D may be called sidelink, SA may be called Physical Sidelink Control Channel (PSCCH), D2D synchronization signal may be called Sidelink Synchronization Signal (SSS), control channel carrying most basic information, which is transmitted together with SSS before D2D communication, may be called Physical Sidelink Broadcast Channel (PSBCH) or Physical D2D Synchronization Channel (PD2DSCH).

Furthermore, a signal for a specific UE to announce that it is located nearby (here, ID of the specific UE may be included in this signal) or such a channel may be called Physical Sidelink Discovery Channel (PSDCH).

According to Rel. 12 on LTE system, only a D2D communication UE transmits PSBCH together with SSS in D2D, whereby measurement of SSS is performed using DMRS of PSBCH. An out-coverage UE measures DMRS of PSBCH and the determines whether to become a synchronization source by measuring RSRP of this signal and the like.

Moreover, in case of V2X communication, a control channel and a data channel are regarded as existing like D2D. Thus, when there exist a control channel and a data channel associated with the control channel, assume a situation that several vehicles come in and transmit periodic messages. Assuming that a vehicle is a UE, the UE can obtain resources location of the currently transmitted messages by decoding a currently transmitted control channel or performing energy sensing of a data channel And, the UE may further obtain resource locations that will be transmitted by Tx UEs.

Based on the aforementioned contents, when various types of wireless communication technologies (e.g. transmission services) coexist in V2X, how to perform resource allocation is described in the present invention.

V2X technology based on Rel.14 of LTE system mainly targets messages related to public safety such as a Cooperative Awareness Message (CAM) and a Decentralized Environmental Notification Message (DENM). A public safety relevant message is characterized in that a range is long in general. Hence, in order for a weak desired signal to avoid strong in-band emission, location based resource allocation is used. The location based resource allocation means a scheme of dividing a vehicle existing area into several small areas and then mapping the small areas to different resource pools, respectively.

In this case, an adjacent small area may be configured to have a different resource pool, and each small area may be further free from interference or in-band emission. According to the present invention, for clarity of the following description, a small area is defined as a coverage of an area transmitted by a specific device (e.g., vehicle) per carrier, by which the present invention is non-limited.

Moreover, the 5G new RAT currently discusses a platooning service for V2X technology. The platooning service means a service that V2X applied devices (e.g., cars) move together by gathering in a row. Here, a tanker of the platooning service, i.e., a foremost vehicle among the gathering vehicles of the platooning service drives as a representative of the gathering vehicles and the rest of the vehicles automatically move along the tanker without driver's manipulation. Such an operation of the platooning service can advantageously raise fuel efficiency of a vehicle. Therefore, for such a platooning service, it is necessary to form a communication group in a short range among the platooning vehicles.

First Embodiment

According to a first embodiment of the present invention, as described above, when a long range communication and a short range communication coexist, a method of allocating a different resource pool to each range is proposed.

According to the present method, it is able to further avoid collision between resources by sharing a resource with a service in the same range. For example, assume that there are a vehicle V_B of a long range communication sharing a specific resource pool and vehicles V_C and V_D of a short range communication.

A resource used by the vehicle V_B in the specific resource pool can be recognized by the vehicles V_C and V_D. The reason for this is because a communication range of the vehicle V_B is wide. Yet, the vehicles V_C and V_D are unable to mutually recognize resources in use and may select resources for the short range communication, respectively. In this case, if the two vehicles use the same resource, when the two vehicles move close to each other, messages of the two vehicles may collide with each other. Hence, it is necessary to allocate a resource pool differently per communication range. A method of allocating a resource pool differently according to a communication range may consider the following methods 1-1 to 1-5. Here, when a resource pool is allocated differently per communication range or communication message, a resource pool may be mapped to a different carrier.

Method 1-1: Configure a resource pool according to a transmission power range.

Method 1-2: Configure a resource pool according to a size of a Tx message.

Method 1-3: Configure a resource pool according to a value of a Tx MCS.

Method 1-4: Configure a resource pool according to the number of transmissions/retransmissions.

Method 1-5: Configure a resource pool according to a multiple access scheme, a transmission time interval length, or a subcarrier spacing value.

First of all, regarding the method 1-1, since a long range communication and a short range communication will transmit a high power and a low power, respectively, a resource pool can be naturally separated per communication range.

Regarding the method 1-2, since it is highly probable that a short range communication can exchange a packet in small size in consideration of frequent transmissions and it is also highly probable that a long range communication can exchange a packet in large size in consideration of less-frequent transmissions, a resource pool can be naturally separated per communication range.

Regarding the method 1-3, reliable requirements may differ from each other according to a communication range. For high reliability, a low MCS may be required. For low reliability, a high MCS is used to raise resource efficiency. Hence, by configuring a resource pool according to a value of MCS, a resource pool can be configured per communication range.

Regarding the method 1-4, reliable requirements may differ from each other according to a communication range. For high reliability, the high number of retransmissions may be required. For low reliability, the small number of retransmissions is used to raise resource efficiency. Hence, by configuring a resource pool according to a value of retransmission, a resource pool can be configured per communication range.

Regarding the method 1-5, a long range or a short range or a short range can be classified or implemented with a different multiple access scheme, a different TTI length, or a different subcarrier spacing value. For example, since SC-FDMA (e.g., long TTI) is used for a long range usage and OFDM (e.g., short TTI) is used for a short range usage, a resource pool can be configured based on this. In such a case, a V2X resource pool can be interpreted as separately configured or signaled according to a different multiple access scheme, a different Transmission Time Interval (TTI) length, or a different subcarrier spacing value.

Moreover, according to the aforementioned methods 1-1 to 1-4, a resource pool may be configured according to a range of a power, a message, an MCS, or the retransmission number or a maximum/minimum value thereof. According to the combinations of the methods 1-1 to 1-4, a power value, message, MCS or retransmission number applicable to a specific V2X device is defined by being combined with a single parameter, and a power value, message, MCS or retransmission number associated with a specific parameter included in information (e.g., indicator) indicating a resource pool may be configured to be recognizable by a UE.

According to the aforementioned method 1-5, a resource pool may be configured according to a range of a TTI length or subcarrier spacing, or a maximum or minimum value thereof.

Second Embodiment

According to a second embodiment of the present invention, a resource pool can be operated in a manner of being shared irrespective of a communication range. This is advantageous in raising efficiency of a resource within a resource pool in case of using a single resource pool despite that traffic is different per communication range. In this case, a UE may need to transmit a plurality of services of different communication ranges together.

For example, while a CAM or DENM message is transmitted (hereinafter, a service E), a platooning service (hereinafter, a service P) may be joined. In such a case, a message transmission like a service E may have a long transmission period and a message transmission like a service P may have a relatively short transmission period. Here, different resource selections may be made for the two services, respectively. Or, a resource selection of a short period is selected once only and both of the two services may be then transmitted on the selected resource. Namely, according to the platooning service, some resources failing to be transmitted in every period may exist despite having a short period, whereby a resource can be efficiently used in a manner of using such resources for a service of a message transmission of a long period. Accordingly, the second embodiment proposes a method 2-1 and a method 2-2 in the following.

Method 2-1: A UE selects a single resource set and transmits a multitude of messages respectively corresponding to a multitude of services on a single resource set. Since each service has a different communication range, each resource within the resource set and be transmitted with a different power.

Here, a prescribed resource in the selected resource set may operate for a single service only. For example, after a resource having a period of 10 ms has been selected, a resource region having a period of 100 ms amounting to ⅒ of the period of 10 ms can be used for a service E. In such a case, in order to secure a wide coverage, a transmission is made with a relatively high power in the resource region having the period of 100 ms.

Services can be used in the rest of the resource regions by being mixed with each other. In such a case, a transmission is made with a power corresponding to each service. Moreover, a prescribed resource may be allocated for a single service and the rest of resources may be used for a transmission of this service. Namely, when a message (e.g., a message A) possibly frequent despite not appearing periodically and a message (e.g., a message A) mandatory to appear periodically are used by being mixed with each other, although the periodically appearing message (i.e., message A) is transmitted periodically, only if the message not appearing periodically (i.e., message B) is not used for the rest of the resources, the rest of the resources are used for a transmission of the periodic message (message A). Thus, resources are not wasted.

Or, messages per transmission power may use a resource corresponding to a constantly fixed pattern only within a resource set. Namely, a UE allows other UEs to use a resource occupied by a message corresponding to a coverage not affecting the UE itself without using a resource occupied by a message corresponding to a coverage affecting the UE itself.

Moreover, when a multitude of messages corresponding to a multitude of coverages are transmitted on a single resource set, a message (or a control channel corresponding to the message) having a longest coverage (or a highest transmission power) can be set to indicate that services of coverages smaller than the longest coverage occupy the resource set together. Namely, although UEs recognize a message of a long coverage and may not select a corresponding resource, since messages of short coverages have low power, the UEs may select the corresponding resource, which should be prevented.

Or, a message having a longest coverage (or a highest transmission power) or a control channel corresponding to this message may indicate location information of a UE. This is to enable other UEs to estimate which part of a currently used resource will work as interference on the UE itself. UEs may obtain location information. If a Tx UE is located nearby, the UEs can select a resource to use by avoiding all resources used by the Tx UE. Or, when UEs monitor location information, if a Tx UE is located far away, the UEs can select a resource to use by avoiding a resource on which a message having a high power is transmitted among resources used by the Tx UE. Thus, the far/near reference between UEs may be determined per service in advance or configured by RRC signaling.

For example, when there are a service A and a service B, if a distance according to GPS is equal to or greater than L_A, a resource used by the service A is determined to be selectable by another UE. And, if a distance according to GPS is equal to or greater than L_B, a resource used by the service B is determined to be selectable by another UE. Here, the value L_A or L_B may be determined in advance or configured by RRC signaling.

Method 2-2: When a resource pool is operated in a manner of being shared mutually irrespective of a communication range, a different approach may be considered depending on a service. For example, when there is a UE transmitting a CAM or DENM message (service E) only, the CAM or DEMN message (service E) and a message for a platooning service (hereinafter, a service P) are transmitted together, the two messages can be transmitted as a single packet (hereinafter a service P').

In such a case, a message transmission such as a service E may have a relatively long transmission period and a message transmission such as a service P may have a relatively short transmission period. Here, a Tx UE may make transmission for the service P with a period shorter than that for the service E. In doing so, a message for the service E and a message for the service P are included together in a message for the service P'.

Hence, after a resource selection of a short period is made once only, the message for the service P' is transmitted on the selected resource. Since a message of a long period such as CAM or DEMN is included in the message for the service P' as well, different transmissions may be defined on a partial resource having a long period and the rest of the resource in the resource selected once, respectively.

Namely, a UE selects a single resource set and then transmits a single message having a plurality of services merged therein on the single resource set. Since the services have different communication ranges, respectively, although a single message having several services merged within the resource set is transmitted, the message can be transmitted in a manner that the different transmission methodologies of the services are used by being mixed with each other.

Here, the transmission methodology may have a different power or power range, a different MCS or MCS range, a different retransmission number or a range of a retransmission number, a different block size or a range of a resource block size, a different multiple access scheme (e.g., OFDM or SC-FDMA), or a TTI length/subcarrier spacing value, per service. The whole or portion of this methodology may be signaled per service type by higher layer signaling (e.g., RRC signaling).

Figure 12:
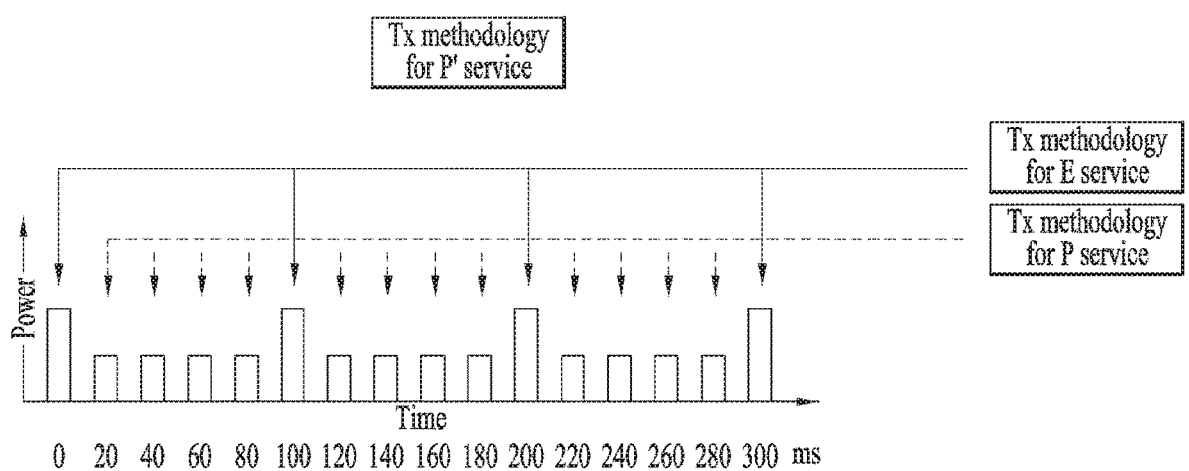
FIG. 12 is a reference diagram to describe a scenario of transmitting packets for a multitude of services according to one embodiment of the present invention.
Figure 13:
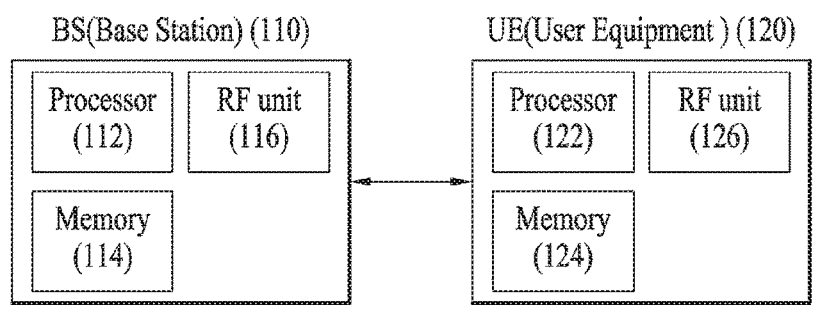
FIG. 13 shows a base station and a user equipment applicable to one embodiment of the present invention.

For example, as shown in FIG. 12, when a service E has a message transmission period of 100 ms and a service P has a message transmission period of 20 ms, if a power of the service E is greater than that of the service P, the service E and the service P are transmitted in a manner of being tied as a packet. In doing so, a service P' is transmitted in the period of 100 ms according to a transmission methodology of the service E or transmitted in the period of 20 ms according to a methodology of the service P. in this case, at a timing at which the period of 100 ms and the period of 20 ms meet each other, transmission is made along a transmission methodology of a long period. Of course, at a same period timing, all the services may be transmitted in a single time interval amounting to the number of services according to the transmission methodologies, respectively. And, each of the services is transmitted on a different carrier (or a different resource pool) according to the transmission methodology of the corresponding service, whereby collision can be avoided. Thus, each service is transmitted on a different carrier or resource pool. This is to secure reliability of a high-priority message using a different carrier or resource pool.

Since an Rx UE is aware of a transmission methodology of each service by higher layer signaling, the Rx UE receives a service to work to a transmission methodology corresponding to the service on the assumption that a Tx UE is transmitting the service based on a transmission methodology according to a service supposed to be received by the Rx UE. Although the respective transmission methodologies are configured different, as several services are transmitted by being tied into a single packet, the Rx UE decodes the packet and then takes a portion for a service necessary for the Rx UE only.

When a long period service and a short period service (or services having different transmission methodologies) are transmitted as a single packet together, as periods for the different transmission methodologies are different, Tx timings according to the transmission methodologies overlap with each other. In this case, if a Tx UE transmits a service using a single (e.g., a longer period) transmission methodology, an Rx UE performs decoding in a manner of working to the corresponding transmission methodology in a time interval in which the Tx timings overlap with each other.

For example, as shown in FIG. 12, while a Tx UE is transmitting a service, an Rx UE requiring a service P performs decoding by working to a fact that a transmission is made by a transmission methodology matched up with a service E in a period of 100 ms and also performs decoding to work to a transmission methodology of the service P at the other Tx timing.

Namely, in case that all services are transmitted in a single time interval as many as the service number according to the respective transmission methodologies at a period overlapping timing, an Rx UE can: i) decode a part for a transmission methodology of a desired service among the services only; ii) since all transmission packets have all services, use Tx data for decoding entirely or in part; iii) in case of transmitting each service on a different carrier (or a different resource pool) according to a transmission methodology of the corresponding service, decode a part for a transmission methodology of a desired service only; or iv) decode a service to work to each transmission methodology in some or all of Tx carriers (or a different resource pool).

Moreover, a prescribed resource in a selected resource set may operate with a transmission methodology of transmitting a single service originally. For example, when a service E having a period of 100 ms and a service P having a period of 10 ms are transmitted as a single packet by being tied together, a resource of a period of 10 ms is selected and a resource region of a period of 100 ms amounting to ⅒ of a resource region of a period of 10 ms is then transmitted every 100 ms to work to the transmission methodology for transmitting the service E. In doing so, although a message may include all messages for a plurality of services, it may be transmitted with a period of 100 ms. In such a case, in order to secure a wide coverage in the resource region of the period of 100 ms, a relatively high power is transmitted.

Here, a selected single service may be transmitted to work to a transmission methodology specified for the selected single service.

Here, the transmission methodology may have a different power or power range, a different MCS or MCS range, a different retransmission number or a range of a retransmission number, a different block size or a range of a resource block size, a different multiple access scheme (e.g., OFDM or SC-FDMA), or a TTI length/subcarrier spacing value, per service. The whole or portion of this methodology may be signaled per service type by higher layer signaling (e.g., RRC signaling).

In the remaining resource region, one of the services remaining in some resources can operate with an originally transmitted transmission methodology. Here, on these resources, a selected single service may be transmitted to work to a transmission methodology specified for the selected single service. Repeatedly, each different service among the services reaming in some resources in the reaming resource region may operate with an originally transmitted transmission methodology. Here, on these resources, a selected single service may be transmitted to work to a transmission methodology specified for the selected single service.

In the remaining resource region, services may be used in a manner of mixing transmission methodologies specified for the services with each other. Hence, each different service is transmitted to work to a transmission methodology specified for the corresponding service.

Or, a UE may use a resource corresponding to a constantly fixed pattern in a resource set per original transmission methodology of messages. This is to allow other UEs to use only a resource occupied by a message corresponding to a coverage not affecting the UE without using a resource occupied by a message corresponding to a coverage affecting the UE.

When a multitude of messages corresponding to a multitude of coverages are transmitted as a single packet on a single resource set, by working to a transmission methodology of a message having a longest coverage (or a highest transmission power), i) data transmitting the message in case of transmission on a prescribed resource of the resource set or ii) a control channel corresponding to the data can be made to indicate that the transmitted packet occupies the resource set by working to a transmission methodology of messages having coverages smaller than the longest coverage. Namely, as UEs recognize a resource transmitted by a transmission methodology of a long coverage message, the UEs may not select the corresponding resource. Yet, since a resource transmitted by a transmission methodology of short-coverage messages has a low power, the UEs may select this resource. This should be prevented.

Or, a data resource transmitted by a transmission methodology of a message having a longest coverage (or a highest transmission power) or a control channel corresponding to the data resource may indicate location information of a Tx UE. Namely, a UE enables other UEs to estimate when a prescribed part of a currently used resource set will work as interference on the UE itself. After the UEs obtain location information, if a Tx UE is located nearby, the UEs can select a resource to use by avoiding all resources used by the Tx UE. On the other hand, after the UEs obtain location information, if a Tx is located far away, the UEs may select a resource by avoiding a resource transmitted by a transmission methodology of a message having a highest power among resources used by the Tx UE. Thus, the far/near reference between UEs may be determined per service in advance or configured by RRC signaling. For example, when there are a transmission methodology of a service A and a transmission methodology of a service B, a resource transmitted by the transmission methodology of the service A is set to be determined by another UE if a distance according to GPS is equal to or greater than L_A. And, a resource transmitted by the transmission methodology of the service A is determined to be selected by another UE if a distance according to GPS is equal to or greater than L_B. Here, the value L_A or L_B may be determined in advance or configured by RRC signaling.

FIG. 12 illustrates a base station (BS) and a user equipment (UE) applicable to an embodiment of the present invention.

If a relay node is included in a wireless communication system, communication in a backhaul link is performed between the BS and the relay node and communication in an access link is performed between the relay node and the UE. Therefore, the BS or UE shown in the drawing can be substituted with the relay node in some cases.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

As mentioned in the foregoing description, a method of transmitting a signal for V2X communication in a wireless communication system and apparatus therefor are applicable to various wireless communication systems.

What is claimed is:

1. A method of a first user equipment operating in a wireless communication system, the method comprising:
   transmitting, to a second user equipment, control information for a packet including a plurality of messages; and
   transmitting the packet to the second user equipment,
   wherein the control information includes information related to a location of the first user equipment, and
   wherein the information related to the location of the first user equipment is determined according to a value related to a longest communication range among a plurality of communication ranges corresponding to the plurality of messages.

2. A first user equipment operating in a wireless communication system, the first user equipment comprising:
   a transceiver; and
   a processor coupled with the transceiver, the processor configured to:
      transmit, to a second user equipment, control information for a packet including a plurality of messages, and
      transmit the packet to the second user equipment,
   wherein the control information includes information related to a location of the first user equipment, and
   wherein the information related to the location of the first user equipment is determined according to a value related to a longest communication range among a plurality of communication ranges corresponding to the plurality of messages.

3. The method of claim 1, wherein the control information includes information indicating that one or more messages corresponding to communication ranges which are shorter than the longest communication range are included in the packet.

4. The method of claim 1, further comprising:
   selecting a resource set for the packet including the plurality of messages,
   wherein the resource set comprises a plurality of resource region corresponding to the plurality of communication ranges.

5. The method of claim 4, wherein the packet is transmitted on a resource region corresponding to the longest communication range among the plurality of resource region.

6. The method of claim 1, further comprising:
   receiving information about the plurality of communication ranges from a network.

7. The first user equipment of claim 2, wherein the control information includes information indicating that one or more messages corresponding to communication ranges which are shorter than the longest communication range are included in the packet.

8. The first user equipment of claim 2, wherein the processor is further configured to select a resource set for the packet including the plurality of messages,
   wherein the resource set comprises a plurality of resource region corresponding to the plurality of communication ranges.

9. The first user equipment of claim 8, wherein the packet is transmitted on a resource region corresponding to the longest communication range among the plurality of resource region.

10. The first user equipment of claim 2, wherein the processor is further configured to receive information about the plurality of communication ranges from a network.

* * * * *